United States Patent
Kim et al.

(10) Patent No.: US 9,818,022 B2
(45) Date of Patent: Nov. 14, 2017

(54) METHOD OF DETECTING OBJECT IN IMAGE AND IMAGE PROCESSING DEVICE

(71) Applicant: Samsung Electronics Co., Ltd., Suwon-si, Gyeonggi-do (KR)

(72) Inventors: Irina Kim, Suwon-si (KR); Woong-hee Lee, Seoul (KR); Byeoung-su Kim, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 52 days.

(21) Appl. No.: 14/965,027

(22) Filed: Dec. 10, 2015

(65) Prior Publication Data
US 2016/0171285 A1 Jun. 16, 2016

(30) Foreign Application Priority Data
Dec. 12, 2014 (KR) ........................ 10-2014-0179351

(51) Int. Cl.
G06K 9/00 (2006.01)
G06K 9/62 (2006.01)

(52) U.S. Cl.
CPC ....... *G06K 9/00228* (2013.01); *G06K 9/6203* (2013.01); *G06K 9/6257* (2013.01); *G06K 9/6292* (2013.01)

(58) Field of Classification Search
None
See application file for complete search history.

(56) References Cited

U.S. PATENT DOCUMENTS

| | | | |
|---|---|---|---|
| 8,363,983 B2 | 1/2013 | Jeon et al. | |
| 8,565,482 B2 | 10/2013 | Ding et al. | |
| 8,630,483 B2 | 1/2014 | Levi et al. | |
| 8,724,890 B2 | 5/2014 | Levi et al. | |
| 8,811,727 B2 | 8/2014 | Mohamed | |
| 2013/0300900 A1 | 11/2013 | Pfister et al. | |
| 2014/0023232 A1* | 1/2014 | Kim ................ | G06K 9/00624 382/103 |
| 2014/0063236 A1 | 3/2014 | Shreve et al. | |
| 2014/0079286 A1 | 3/2014 | Lee et al. | |
| 2014/0139424 A1 | 5/2014 | Chang | |

FOREIGN PATENT DOCUMENTS

| | | |
|---|---|---|
| JP | 2009-093490 A | 4/2009 |
| KR | 10-2014-0013142 A | 2/2014 |
| WO | WO-2012-139271 A1 | 10/2012 |

* cited by examiner

*Primary Examiner* — Hadi Akhavannik
(74) *Attorney, Agent, or Firm* — Harness, Dickey & Pierce, P.L.C.

(57) ABSTRACT

At least one example embodiment discloses a method of detecting an object in an image. The method includes receiving an image, generating first images for performing a first classification operation based on the received image, reviewing first-image features of the first images using a first feature extraction method with first-type features, first classifying at least some of the first images as second images, the classified first images having first-image features matching the first-type features, reviewing second-image features of the second images using a second feature extraction method with second-type features, second classifying at least some of the second images as third images, the classified second images having second-image features matching the second-type features and detecting an object in the received image based on results of the first and second classifying.

17 Claims, 13 Drawing Sheets

FIG. 3
Operations of Image Pyramid Generating Unit
Original Image / Image Pyramid
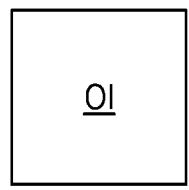  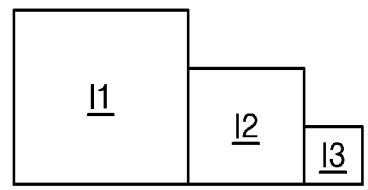

Operations of Downscaling Unit

METHOD OF DETECTING OBJECT IN IMAGE AND IMAGE PROCESSING DEVICE

CROSS-REFERENCE TO RELATED APPLICATION

This application claims the benefit of Korean Patent Application No. 10-2014-0179351, filed on Dec. 12, 2014, in the Korean Intellectual Property Office, the disclosure of which is incorporated herein in its entirety by reference.

BACKGROUND

Inventive concepts relate to a method of detecting an object in an image and an image processing device, and more particularly, to a method of detecting an object, rapidly and precisely, and an image processing device.
In recent years, the use of portable information devices, such as smartphones, has sharply increased. As content used by the portable information devices has become of multimedia types, various devices for manipulating and generating multimedia-type content have been applied to portable information devices. In particular, various functions for increasing user convenience have been researched in portable information devices including cameras.

SUMMARY

Research has been conducted into a technique of detecting an object in an obtained image. An object detection function may be adopted to detect an object in an image. Furthermore, a specific mood and pose of the object in the image may be detected.

However, in an object detection method for increasing the precision of detection of an object from an obtained image based on a plurality of images, it may take a long time to detect the object. In contrast, an object detection method for acceleration detection of an object may reduce the precision of the detection of the object.

Inventive concepts provide a method of detecting an object rapidly and precisely, and an image processing device.

At least one example embodiment of inventive concepts discloses a method of detecting an object. The method includes receiving an image, generating first images for performing a first classification operation based on the received image, reviewing first-image features of the first images using a first feature extraction method with first-type features; first classifying at least some of the first images as second images, the classified first images having first-image features matching the first-type features, reviewing second-image features of the second images using a second feature extraction method with second-type features; second classifying at least some of the second images as third images, the classified second images having second-image features matching the second-type features, and detecting an object in the received image based on results of the first and second classifying.

The first feature extraction method may be different from the second feature extraction method, and the using the second feature extraction method may is longer time than the using the first feature extraction method.

The first feature extraction method uses a Haar feature extraction method, and the second feature extraction method uses any one of a local binary pattern (LBP), a histogram of oriented gradient (HOG), scale invariant feature transform (SIFT), a Gabor transform, Ferns, or modified census transform (MCT).

A number of types of features in the first-type features may be less than a number of types of features in the second-type features.

The second images may correspond to face candidate images, and the second-type features may correspond to human-body measurement information. The third images a group of the face candidates including a face corresponding to the human-body measurement information.

The generation the first images may include generating an image pyramid based on the received image, downscaling each image of the image pyramid; generating a plurality of scaled images including the received image and the downscaled images, filtering the plurality of scaled images based on color maps of the plurality of scaled images, and converting the filtered scaled images into the first images.

The first classifying classifies based on a first classifier, the second classifying classifies based on a second classifier, and the first classifier may be a different type than the second classifier.

The second classifying may further include converting the second images into a structure associated with the second feature extraction method.

The method may further include clustering at least some of the third images and generating at least one image group based on the clustering, the clustered third images corresponding to a same object.

The clustering includes selecting a representative image from among the at least one image group, and the method further include performing an object tracking operation or an object recognition operation based on the representative image and the second-type features.

According to another example embodiment of inventive concepts an image processing device may include an image pyramid generating unit configured to receive an image and generate an image pyramid based on the received image, a pre-filter unit configured to receive the image pyramid, downscale each image of the image pyramid, and output some images of a plurality of scaled images including the received image and the downscaled images, a first image conversion unit configured to receive the some images and convert the some images into first images, a first classification unit configured to receive the first images, review first-image features of the first images using a first feature extraction method with first-type features, and firstly classify at least some of the first images, as second images, the classified first images having first-image features matching the first-type features, and a second classification unit configured to receive the second images, review second-image features of the second images using a second feature extraction method with second-type features, and secondly classify at least some of the second images as third images, the classified second images having second-image features matching the second-type features.

The image processing device may include a second image conversion unit configured to convert the second images into a structure associated with the second feature extraction method.

The image processing device may further include a clustering unit configured to perform a clustering operation of at least some of the third images and generate at least one image group based on the clustering, the clustered third images corresponding to a same object.

The clustering unit is configured to select a representative image from among the image groups and the device includes at least one of an object tracking unit and an object recognition unit configured to receive the representative image and at least one of the second-type features and track or recognize the object based on the received representative image and at least one second-type feature.

A classifier in the first classification unit may be of a different type from a classifier in the second classification unit, and a method of extracting the first-type features may be different from a method of extracting the second-type features.

At least one example embodiment discloses a method including receiving a number of first images based on an obtained image, first classifying a portion of the first images as second images based on first-type features, second classifying a portion of the second images as third images based on second-type features, a number of types of features in the first-type features being less than a number of types of features in the second-type features and detecting an object in the obtained image based on the third images.

In an example embodiment, the first-type features include a size of the object and a shape of the object.

In an example embodiment, the second-type features include a pattern of the objection and a color of the object.

In an example embodiment, the first classifying uses a first extraction method and the second classifying uses a second extraction method.

In an example embodiment, the first extraction method is shorter than the second extraction method.

BRIEF DESCRIPTION OF THE DRAWINGS

Example embodiments of inventive concepts will be more clearly understood from the following detailed description taken in conjunction with the accompanying drawings in which:

FIG. 3 is a diagram of an operation of an image pyramid generating unit of FIG. 2;

DETAILED DESCRIPTION

Figure 1:
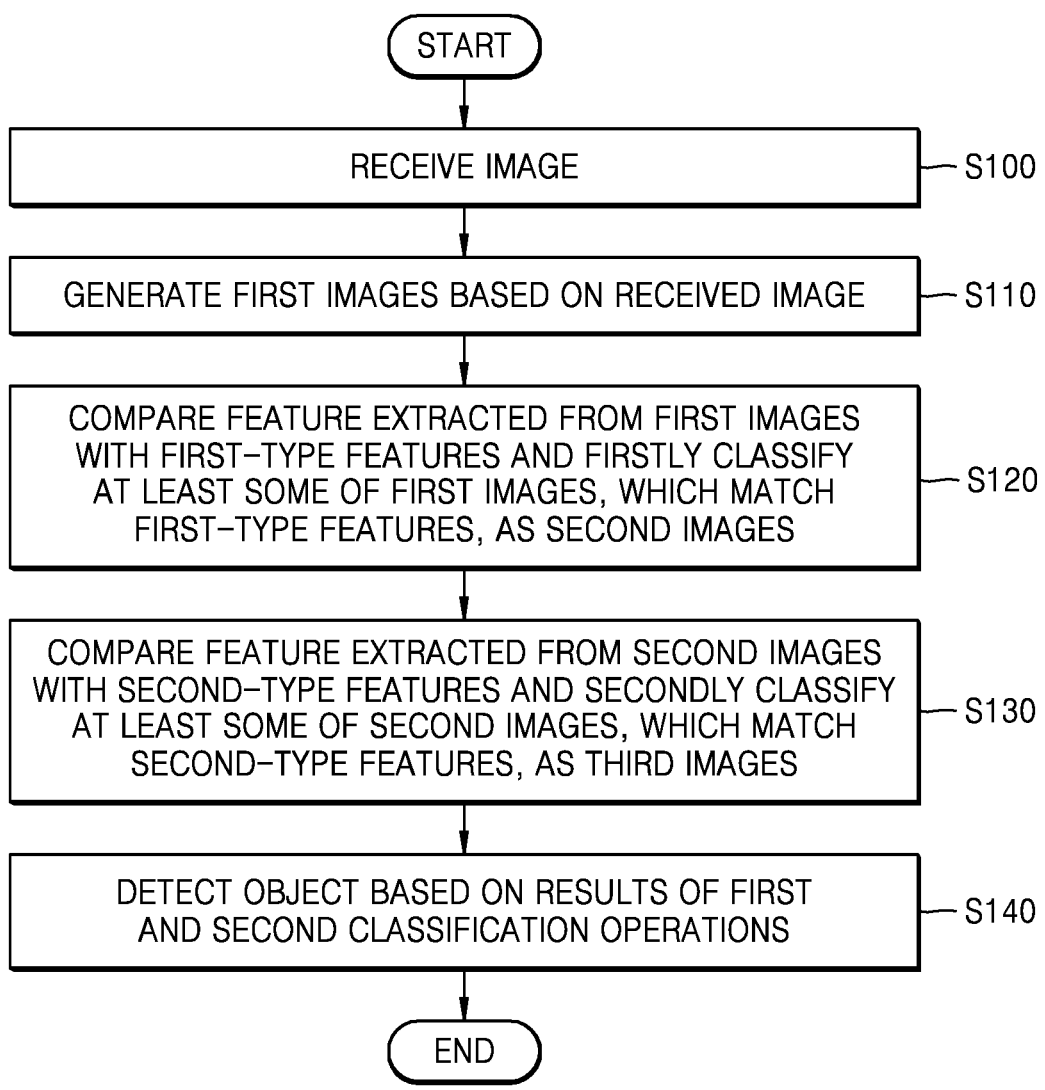
FIG. 1 is a flowchart of a method of detecting an object in an image, according to an example embodiment.

As used herein, expressions such as "at least one of," when preceding a list of elements, modify the entire list of elements and do not modify the individual elements of the list.

Inventive concepts will now be described more fully hereinafter with reference to the accompanying drawings, in which example embodiments of inventive concepts are shown. Example embodiments are provided so that this disclosure is thorough and complete and fully conveys the scope of inventive concepts to one skilled in the art. Accordingly, while inventive concepts can be modified in various ways and take on various alternative forms, specific embodiments thereof are shown in the drawings and described in detail below as examples. There is no intent to limit inventive concepts to the particular forms disclosed. On the contrary, inventive concepts are to cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing example embodiments only and is not intended to be limiting of inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of inventive concepts.

Unless otherwise defined, all terms (including technical and scientific terms) used herein have the same meaning as commonly understood by one of ordinary skill in the art to which inventive concepts. It will be further understood that terms, such as those defined in commonly used dictionaries, should be interpreted as having a meaning that is consistent with their meaning in the context of the relevant art and will not be interpreted in an idealized or overly formal sense unless explicitly so defined herein.

FIG. 1 is a flowchart of a method of detecting an object in an image, according to an example embodiment. The method of FIG. 1 may be performed by an image processing device. Referring to FIG. 1, an image may be externally received (S100). First images may be generated based on the received image (S110). A feature extracted from the first images by using a first feature extraction method may be compared with first-type features, so that at least some of the first images, which match the first-type features, may be firstly classified as second images (S120). A feature extracted from the second images by using a second feature extraction method may be compared with second-type features, so that at least some of the second images, which match the second-type features, may be secondly classified as third images (S130). An object may be detected based on results of the first and second classification operations (S140).

Figure 2:
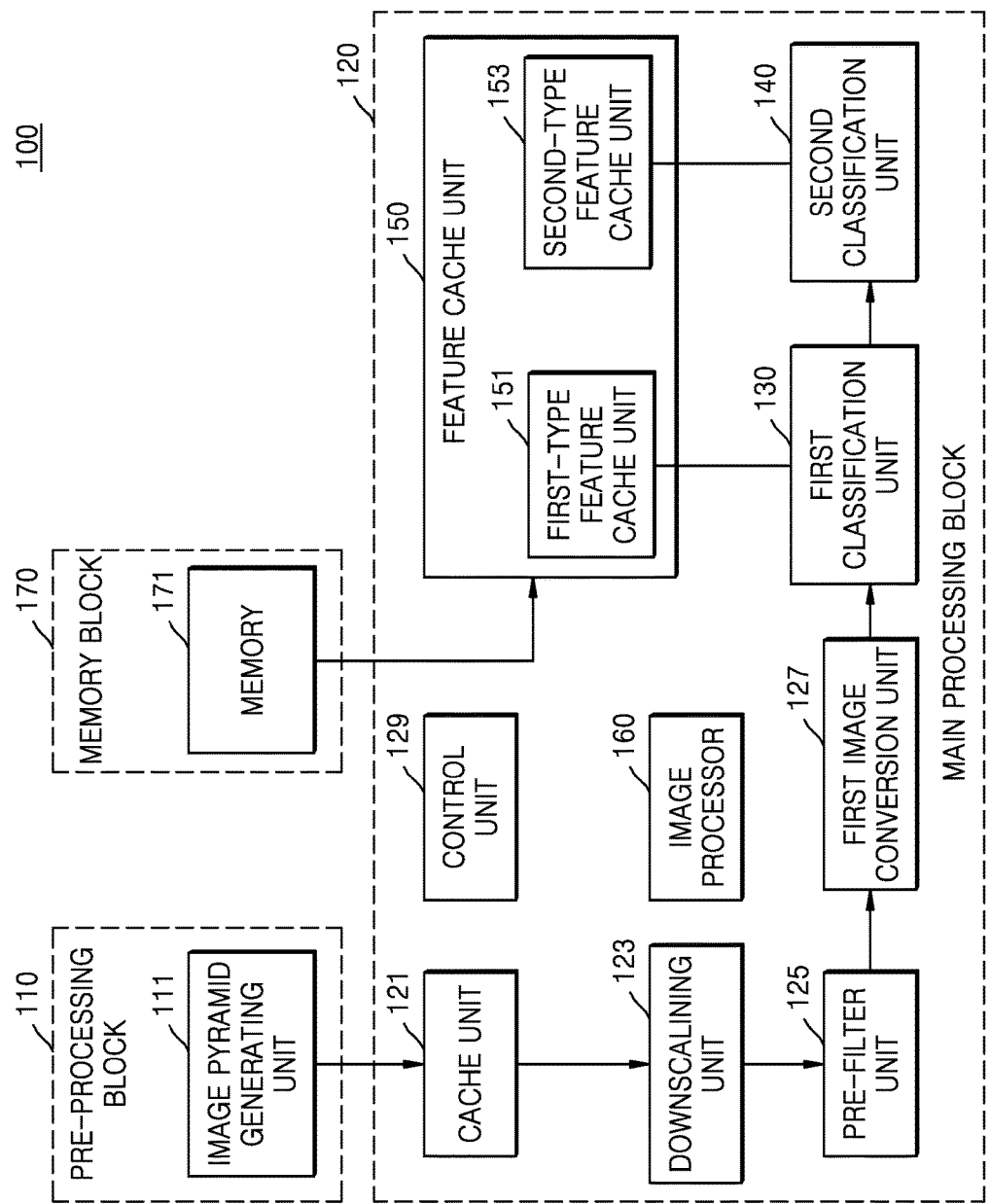
FIG. 2 is a block diagram of an image processing device configured to perform the method of detecting the object, as shown in FIG. 1, according to an example embodiment.

FIG. 2 is a block diagram of an image processing device 100 configured to perform the detection method shown in FIG. 1, according to an example embodiment. Referring to FIG. 2, the image processing device 100 may include a preprocessing block 110, a main processing block 120, and a memory block 170.

The preprocessing block 110 may include an image pyramid generating unit 111. The image pyramid generating unit 111 may externally receive an image and generate an image pyramid based on the received image. Here, the image pyramid may refer to images that are sequentially downscaled according to a ratio and number determined by a user. The image pyramid generating unit 111 may generate sequentially downscaled images according to a predetermined and/or selected ratio and number from a user.

For example, the image pyramid generating unit 111 may generate an image having a size equal to 1/n the size of the received image, generate an image having a size equal to 1/n the size of the downscaled image, and generate further downscaled images. The image pyramid generating unit 111 may generate a predetermined and/or selected number of downscaled images. The image pyramid generating unit 111 may output images including an original image and downscaled images.

Although it is described above that the image pyramid generating unit 111 generates downscaled images, inventive concepts are not limited thereto. The image pyramid generating unit 111 may generate an upscaled image. Although it is described above that the image pyramid generating unit 111 generates the image pyramid according to a predetermined and/or selected ratio, inventive concepts are not limited thereto. The image pyramid generating unit 111 may generate the image pyramid according to at least two ratios. Also, the image pyramid generating unit 111 may further generate a color map. The image pyramid generating unit 111 may generate and output a color map of an original image or color maps of the original image and downscaled images.

The main processing block 120 may include a cache unit 121, a downscaling unit 123, a pre-filter unit 125, a first image conversion unit 127, a control unit 129, a first classification unit 130, a second classification unit 140, and a feature cache unit 150.

The main processing block 120 may be hardware, firmware, hardware executing software or any combination thereof. When the main processing block 120 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to be the cache unit 121, the downscaling unit 123, the pre-filter unit 125, the first image conversion unit 127, the control unit 129, the first classification unit 130, the second classification unit 140, and the feature cache unit 150. CPUs, DSPs, ASICs and FPGAs may generally be referred to as processors and/or microprocessors.

In the event where the main processing block 120 is a hardware executing software, the control unit 129 and image processor 160 are configured as special purpose machines to cooperatively execute the software, stored in a storage medium, to perform the functions of the downscaling unit 123, the pre-filter unit 125, the first image conversion unit 127, the control unit 129, the first classification unit 130 and the second classification unit 140.

The cache unit 121 may receive the image pyramid output by the image pyramid generating unit 111 and store the image pyramid. The cache unit 121 may store respective images of the image pyramid and output the stored images in units of strips.

The downscaling unit 123 may receive the stored image from the cache unit 121 and generate images having an intermediate size between sizes of images generated by the image pyramid generating unit 111. In another example embodiment, functions of the downscaling unit 123 may be integrated with those of the image pyramid generating unit 111. The image pyramid generating unit 111, the cache unit 121, and the downscaling unit 123 may generate a plurality of scaled images based on an externally received image to perform an object detection operation.

When the image pyramid generating unit 111 generates the color maps of the original image and the downscaled images, the downscaling unit 123 may scale the color maps and generate the scaled color maps.

The pre-filter unit 125 may receive a plurality of scaled images and color maps of the plurality of scaled images from the downscaling unit 123. The pre-filter unit 125 may discard some of the plurality of scaled images based on the color maps. In one example embodiment, the pre-filter unit 125 may discard some images based on colors of the color maps and changes in colors. When a target to be detected is a person, the pre-filter unit 125 may preferentially discard images corresponding to color maps that are free from the color of the skin, from among the color maps. The pre-filter unit 125 may output filtered images.

The first image conversion unit 127 may receive filtered images from the pre-filter unit 125. The first image conversion unit 127 may convert the filtered images into first images, which are targets that may be classified by the first classification unit 130, so that the first classification unit 130 may classify images according to a predetermined and/or selected standard. In one example embodiment, a first image may be an integral image having integral values obtained by integrating pixel values of each of the filtered images. However, inventive concepts are not limited thereto, the first classification unit 130 may convert the filtered images into first images by using various methods so that features included in the first-type features, which are used for the first classification unit 130 to classify images, may be extracted from the filtered images.

The first classification unit 130 may receive the first images from the first image conversion unit 127. The first classification unit 130 may include a plurality of classifiers, which may operate in a cascaded form. Before a first classification operation is performed on the first images, a whole first image selected for the first classification operation may be selected as a window. The window may be selected not as the whole first image but as a portion of the first image. Each of the classifiers included in the first classification unit 130 may perform an operation based on a selected window of the selected first image and first-type features and perform a first classification operation of classifying the first images as second images.

In an example embodiment, each of the classifiers may compare a feature extracted from the selected window of the selected first image with the first-type features, and the corresponding window may be discarded when a comparison result is less than a reference value and determined as "false." When the comparison result is equal to or more than the reference value and determined as "true," a classifier next to the corresponding classifier may perform an operation based on the selected window and the first-type features. However, inventive concepts are not limited thereto. For example, when the comparison result is less than the reference value, the comparison result may be determined as true. Also, when the comparison result is equal to or more than the reference value, the comparison result may be determined as false. The classifiers of the first classification unit 130 may respectively have different features from among the first-type features.

When the window is selected as a part of the first image and the first classification unit 130 finishes performing the first classification operation on the selected window, the first classification operation may be performed on a window disposed in another position of the first image. When the first classification operation is performed on all windows of the first image, the first classification operation may be performed on a first image having another size. Windows corresponding to the first images, each of which is determined as true by the first classification unit 130, may be transmitted as second images to the second classification unit 140.

The main processing block 120 may include a first learning database (DB) related to the first classification unit 130, and an image processor 160 may extract the first-type features by performing a first feature extraction method on a positive sample and a negative sample of an object stored in the first learning DB. Also, the image processor 160 may extract the first-type features from the first image by using the first feature extraction method. In another example embodiment, the first-type features may be extracted from the selected window of the first image by using the first feature extraction method.

In an example embodiment, the first feature extraction method may be a Haar-like method, and the first-type features may be a set of at least one feature. The first-type features may include simpler features than second-type features corresponding to the second classification unit 140 to be described later. The number of types of features included in the first-type features may be less than the number of types of features included in the second-type features. Also, features included in the first-type features may be respectively different from features included in the second-type features. For example, the first-type features may include a size and shape of an object, and the second-type features may further include a pattern, tactile sense, and color of the object. Thus, the second-type features may include more specific features than the first-type features.

The second classification unit 140 may receive second images from the first classification unit 130. The second classification unit 140 may include a plurality of classifiers, which may operate in a cascaded form. Before a second classification operation is performed on the second images, a whole second image selected for the second classification operation may be selected as a window, and the window may be selected not as the whole second image but as a part of the second image. The second classification unit 140 may include different kinds of classifiers from the classifiers included in the first classification unit 130. Each of the classifiers included in the second classification unit 140 may perform an operation based on a selected window of the second image and the second-type features, and perform the second classification operation of classifying the second images as third images.

In an example embodiment, each of the classifiers may perform an operation of comparing a feature extracted from the selected window of the selected second image with the first-type features. When the comparison result is less than a reference value and determined as false, the corresponding window may be rejected and subsequently discarded. When the comparison result is equal to or more than the reference value and determined as true, a classifier next to the corresponding classifier may perform an operation of comparing a feature extracted from the selected window with the second-type features. However, inventive concepts are not limited thereto. For example, when the comparison result is less than the reference value, the comparison result may be determined as true, and when the comparison result is equal to or more than the reference value, the comparison result may be determined as false. The classifiers included in the second classification unit 140 may respectively have different features from among the second-type features. Also, the second classification unit 140 may have a classifier corresponding to at least one of a support vector machine (SVM) method, a linear discriminant analysis (LDA) method, and a principal component analysis (PCA) method.

The main processing block 120 may include a second learning DB related to the second classification unit 140, and the image processor 160 may extract the second-type features by performing a second feature extraction method on a positive sample and a negative sample of an object stored in the second learning DB. Also, the image processor 160 may extract the second-type features from the second image by using the second feature extraction method. In another example embodiment, the image processor 160 may extract the second-type features from a selected window of the second image by using the second feature extraction method.

However, inventive concepts are not limited thereto. For example, each of classifiers included in the second classification unit 140 may not classify a second image as a window but perform an operation based on a feature of the second image and the second-type features to perform the second classification operation of classifying second images as third images. Also, the image processor 160 may extract a feature from a second image by using the second feature extraction method.

In an example embodiment, the second feature extraction method may be any one of a local binary pattern (LBP), a histogram of oriented gradient (HOG), a scale invariant feature transform (SIFT), a Gabor transform, Ferns, or a modified census transform (MCT). According to the second feature extraction method, it may take a longer time to extract each feature than in the first feature extraction method. It may take a longer time to classify images based on the second-type features than to classify images based on the first-type features. Accordingly, the first images may be rapidly classified as second images by the first classification unit 130, and second images of which reliability is ensured may be precisely classified as third images by the second classification unit 140. As a result, classification precision may be increased. In an example embodiment, the first classification unit 130 may extract a feature by using the above-described first feature extraction method and perform the first classification operation. Thus, the image processing device 100 may rapidly classify the received images into a group of face candidates. Also, the second classification unit 140 may extract a feature by using the above-described second feature extraction method and perform the second classification operation to precisely classify the group of face candidates into a face that matches the second-type features. For example, the second-type features may correspond to human-body measurement information, such as a facial expression, skin types, gestures, and the color of the skin.

However, inventive concepts are not limited thereto, and the main processing block 120 may include additional classification units other than the first and second classification units 130 and 140. Features used for the classification units included in the main processing block 120 to perform classification operations may be extracted by using respectively different methods.

The feature cache unit 150 may include a first-type feature cache unit 151 and a second-type feature cache unit 153. The first-type feature cache unit 151 may store first-type features that are used for the first classification unit 130 to perform a first classification operation, and the second-type feature cache unit 153 may store second-type features that are used for the second classification unit 140 to perform a second classification operation. Also, the first-type feature cache unit 151 may provide the stored first-type features to the first classification unit 130, and the second-type feature cache unit 153 may provide the stored second-type features to the second classification unit 140. When the main processing block 120 includes additional classification units other than the first and second classification units 130 and 140, the main processing block 120 may include additional feature cache units other than the first- and second-type feature cache units 151 and 153.

The control unit 129 may control all operations of the main processing block 120. The control unit 129 may control the pre-filter unit 125 to adjust a filtering target according to an object serving as a detection target. The control unit 129 may control the image processor 160 to select and extract the first-type features or the second-type features according to the object serving as the detection target. Also, the control unit 129 may control the first classification unit 130 and the second classification unit 140 to select an image from the first images or the second images and perform the first classification operation or the second classification operation on the selected image.

The memory block 170 may include a memory 171. The memory 171 may include random access memory (RAM). The memory 171 may include a volatile memory, such as static RAM (SRAM), dynamic RAM (DRAM), or synchronous DRAM (SDRAM), or non-volatile memory, such as electrically erasable and programmable read-only memory (EEPROM), flash memory, phase-change RAM (PRAM), magnetic RAM (MRAM), resistive RAM (ReRAM), or ferroelectric RAM (FRAM). The memory 171 may include wide I/O memory.

The memory 171 may include a plurality of features included in the first-type features and the second-type features, and transmit the stored features to the feature cache unit 150. The memory 171 may transmit features selected from the stored features, to the feature cache unit 150 under the control of the control unit 129.

For example, the image processing device 100 may form a System-on-Chip (SoC). Each component of the image processing device 100 may be configured by hardware of the SoC, software executed by hardware, or a combination of hardware and software.

FIG. 3 is a diagram of an operation of the image pyramid generating unit 111 of FIG. 2. Referring to FIGS. 2 and 3, the image pyramid generating unit 111 may receive an original image OI, scale the original image OI, and generate a plurality of scaled images I1 to I3. The scaled images I1 to I3 may include the original image OI. The scaled images I1 to I3 may include the original image OI and images generated by downscaling the original image OI. The generated images may form an image pyramid.

Figure 4:
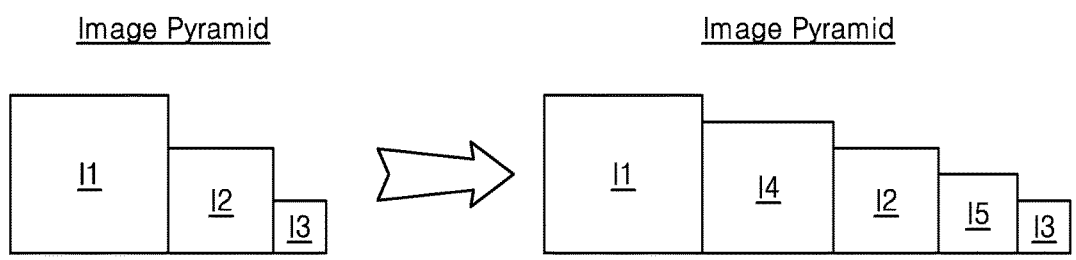
FIG. 4 shows diagrams of a method of downscaling respective images stored in a cache unit by using a downscaling unit of FIG. 2.

FIG. 4 shows diagrams of a method of downscaling respective images stored in the cache unit 121 by using the downscaling unit 123 of FIG. 2.

Referring to FIGS. 2 and 4, the pyramid images I1 to I3 may be downscaled by the downscaling unit 123 to generate a plurality of scaled images I1 to I5. In other words, a plurality of scaled images including the original image OI may be generated by the image pyramid generating unit 111, the cache unit 121, and the downscaling unit 123.

Figure 5:
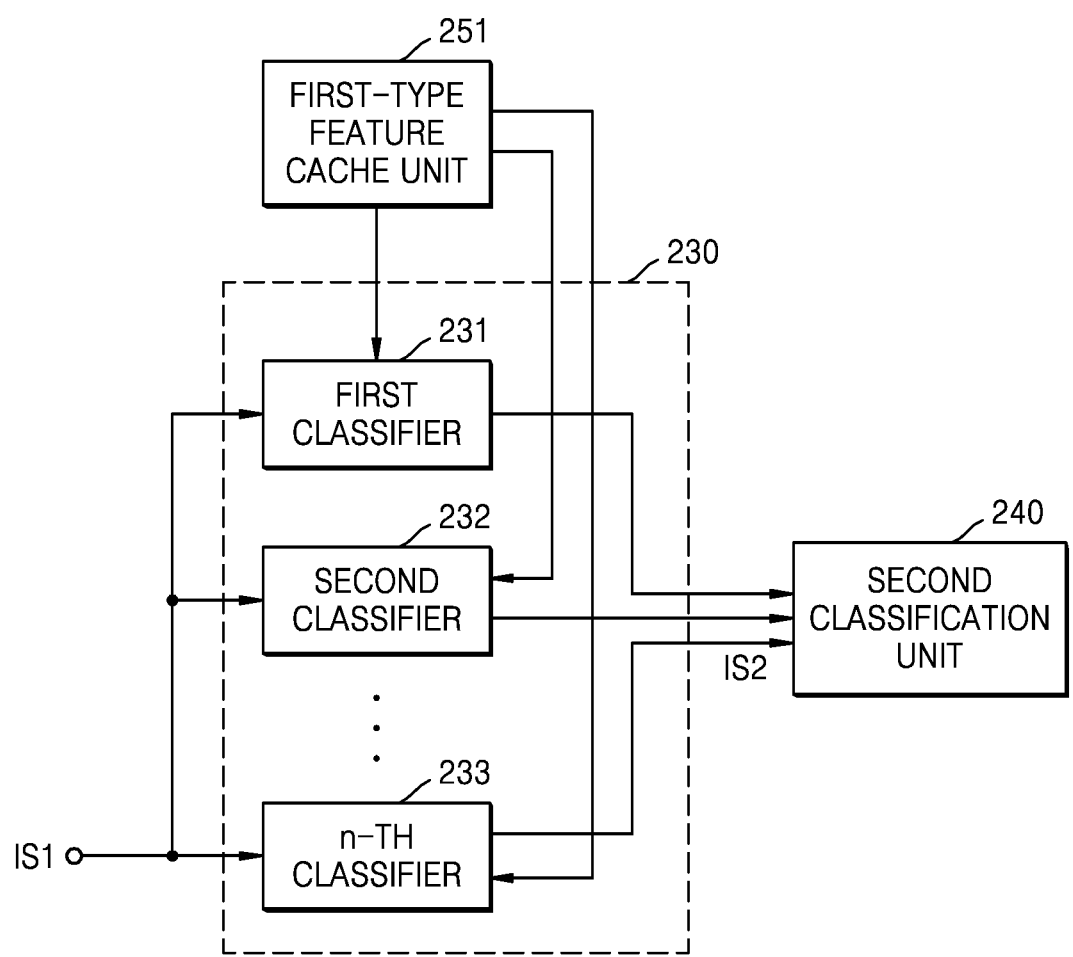
FIG. 5 is a block diagram of a first classification unit performing a first classification operation, according to an example embodiment.

FIG. 5 is a block diagram of the first classification unit 230 performing a first classification operation, according to an example embodiment.

Referring to FIG. 5, the first classification unit 230 may include a plurality of classifiers, for example, first to n-th classifiers 231 to 233. The first classification unit 230 may receive a first image IS1 selected out of first images. In an example embodiment, the first image IS1 may correspond to an integral image, and the respective first to n-th classifiers 231 to 233 may receive the same first image IS1. Also, the first classification unit 230 may receive first-type features from a first-type feature cache unit 251 configured to store the first-type features. The first-type feature cache unit 251 may correspond to the first-type feature cache unit 151. The first-type features may include a plurality of features, and the first to n-th classifiers 231 to 233 may respectively receive different features. Each of the first to n-th classifiers 231 to 233 may perform a first classification operation by performing a comparison operation based on a feature extracted from the received first image IS1 and a feature received from the first-type feature cache unit 251. In an example embodiment, the feature extracted from the first image IS1 may be a feature extracted from a selected window of the first image IS1. The first to n-th classifiers 231 to 233 may perform the first classification operation at the same time. When the first classification operation on the first image IS1 is finished, the first classification operation may be performed on other first images.

However, when the first classification operations are performed in a cascaded form by the first to n-th classifiers 231 to 233, the size and complexity of the image processing device (refer to 100 in FIG. 2) including the first classification unit 230 may be reduced. In an example embodiment, the first classification unit 230 may include one classifier. Different features may be sequentially loaded into the one classifier of the first classification unit 230, and repetitive comparison operations may be performed. In another example embodiment, when comparison operations are simultaneously performed by the first to n-th classifiers 231 to 233, the operating performance of the image processing device 100 including the first classification unit 230 may be improved.

When the selected first image IS1 matches the first-type features, the first classification unit 230 may provide the selected first image IS1 as a second image IS2 to the second classification unit 240. When the selected first image IS1 does not match the first-type features, the first classification unit 230 may discard the selected first image IS1 and may not provide the selected first image IS1 as the second image IS2 to the second classification unit 240. When the first classification operation on the selected first image IS1 is finished, the first classification operation may be performed on other first images.

Figure 6:
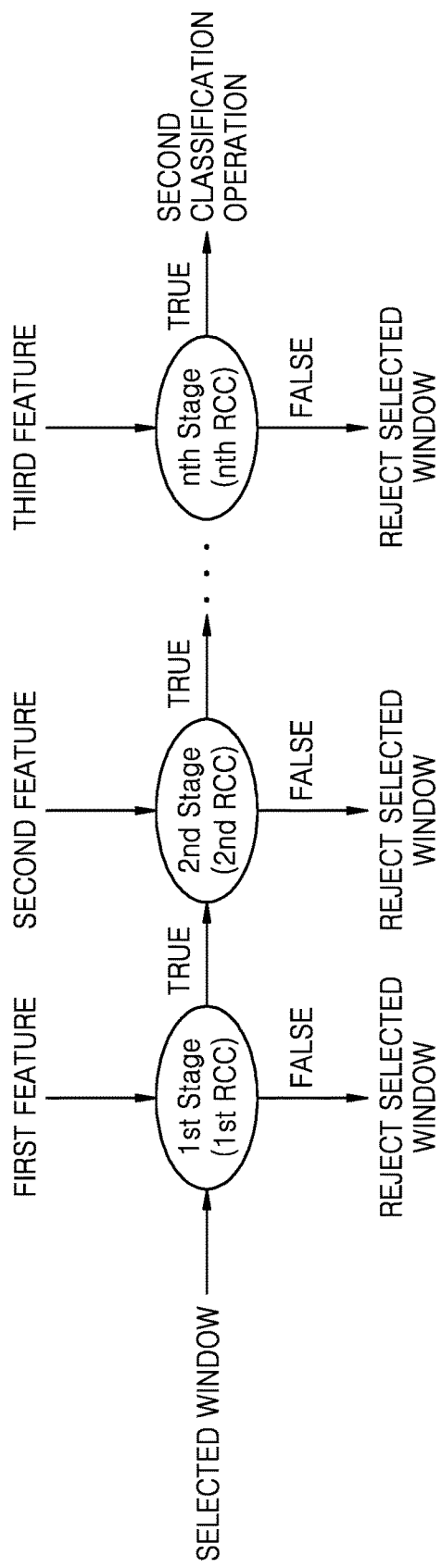
FIG. 6 shows a case in which first and second classifiers included in the first classification unit of FIG. 5 operate in a cascaded form, according to an example embodiment.

FIG. 6 shows a case in which first and second classifiers 231 and 232 included in a first classification unit operates in a cascaded form, according to an example embodiment.

Referring to FIG. 6, a classification operation performed by the first classification unit may be referred to as a first classification operation, which may include a plurality of classification stages. The first classifier 231 may start performing a first classification stage. The first classification stage may be performed by using a first feature of the first-type features. When the first classification stage is determined as false, the selected window may be discarded. When the first classification stage is determined as true, a second classification stage may be performed. The second classification stage may be performed by the second classifier 232. The second classification stage may be performed by using a second feature that is different from the first feature. When the second classification stage is determined as false, the selected window may be discarded. When an n-th classification stage is determined as true in the above-described manner, a second classification operation, which is the next classification operation, may be performed on the selected window.

The window, which is determined as true by all the classifiers, for example, the first and second classifiers 231 and 232, may be transmitted to the second classification unit 240. When the selected window is discarded or the classification operation on the selected window is finished, a window may be selected from a different position of a first image. When the classification of all windows of the first image is finished, a classification operation may be performed on a first image having a different size. However, when the window corresponds to the whole first image, a classification operation may be directly performed on the other first image without selecting the window disposed in the different position.

Figure 7:
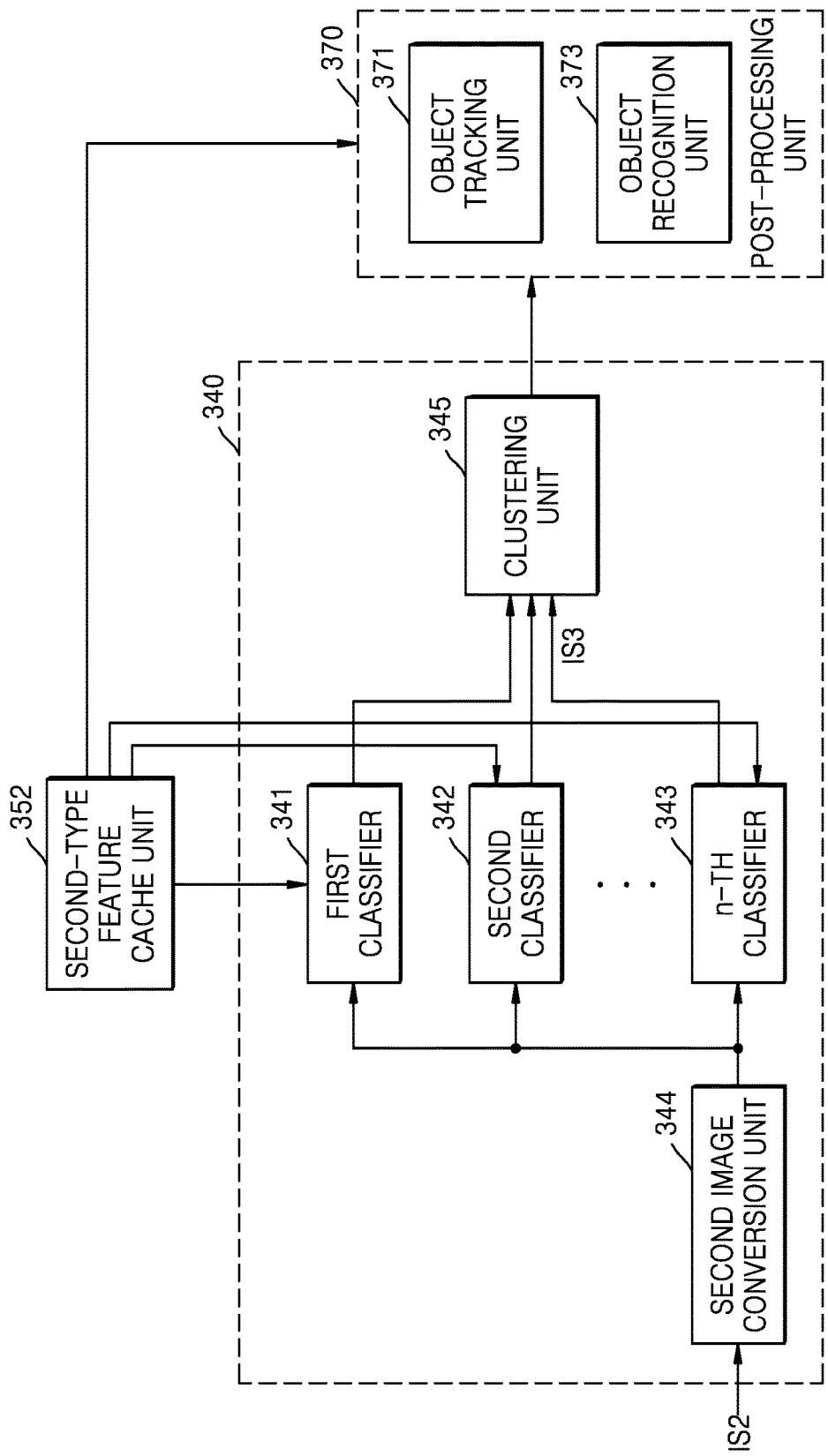
FIG. 7 is a block diagram of a second classification unit performing a second classification operation, according to an example embodiment.

FIG. 7 is a block diagram of a second classification unit 340 performing a second classification operation, according to an example embodiment.

Referring to FIG. 7, the second classification unit 340 may include a plurality of classifiers, for example, first to n-th classifiers 341 to 343, a second image conversion unit 344, and a clustering unit 345. The second classification unit 340 may receive a second image IS2. The second image conversion unit 344 may convert the second image IS2 into an image that may be classified by the second classification unit 340. In an example embodiment, the second feature extraction method of the second classification unit 340 may be a scale invariant feature transform (SIFT) method, and the second image received by the second image conversion unit 344 may be an integral image having integral values obtained by integrating pixel values of the second image IS2. In this case, the second image conversion unit 344 may convert the second image IS2 into an image capable of obtaining a histogram of slope directions and sizes of pixels. Thus, the second classification unit 340 may perform the second classification operation based on the converted second image IS2. However, inventive concepts are not limited thereto, and the second classification unit 340 may directly perform the second classification operation without converting the received second image IS2.

For brevity, the second image converted by the second image conversion unit 344 will be referred to as a second image. The respective first to n-th classifiers 341 to 343 may receive the same second image IS2. Also, the second classification unit 340 may receive second-type features from a second-type feature cache unit 352 configured to store the second-type features. The second-type feature cache unit 352 may correspond to the second-type feature cache unit 153. The second-type features may include a plurality of features, and the respective first to n-th classifiers 341 to 343 may receive different features. Each of the first to n-th classifiers 341 to 343 may perform a second classification operation by performing a comparison operation based on a feature extracted from the received second image IS2 and the feature received from the second-type feature cache unit 352. In an example embodiment, the feature extracted from the second image IS2 may be a feature extracted from the second image IS2 or a selected window of the second image IS2. The first to n-th classifiers 341 to 343 may be classifiers of a different type from the classifiers included in the first classification unit 230 of FIG. 5. Each of the first to n-th classifiers 341 to 343 may be a classifier corresponding to at least one of an SVM, an LDA, or PCA.

In FIG. 7, the first to n-th classifiers 341 to 343 may perform the second classification operation at the same time. However, when the second classification operations are performed by the first to n-th classifiers 341 to 343 in a cascaded form, the size and complexity of the image processing device (refer to 100 in FIG. 2) including the second classification unit 340 may be reduced. In an example embodiment, the second classification unit 340 may include one classifier. Different features may be sequentially loaded into the one classifier of the second classification unit 340, and repetitive comparison operations may be performed. In another example embodiment, when comparison operations are simultaneously performed by the first to n-th classifiers 341 to 343, the operating performance of the image processing device 100 including the second classification unit 340 may be improved.

During the second classification operation, the clustering unit 345 may receive the second image IS2 as a third image IS3 when the second image IS2 matches second-type features, and discard the second image IS2 when the second image IS2 does not match the second-type features. As a result of the second classification operation, the clustering unit 345 may receive a plurality of third images IS3, and perform a clustering operation of clustering some of the third images IS3, which correspond to the same object, to generate image groups. Also, a representative image, which is an optimum and/or desired image, may be selected from each of the image groups or set to detect the object. The clustering unit 345 may provide the representative image or the image group to a post-processing unit 370. Also, the second-type feature cache unit 352 may provide the second-type features to the post-processing unit 370.

The post-processing unit 370 may be included in the image processing device 100 of FIG. 2, and include an object tracking unit 371 and an object recognition unit 373. The object tracking unit 371 may track an object based on the image group or representative image received from the clustering unit 345 and the second-type features received from the second-type feature cache unit 352. Furthermore, a facial expression, pose, and mood of the object may be tracked based on the tracked object. The object recognition unit 373 may recognize an object based on the image group or representative image received from the clustering unit 345 and the second-type features received from the second-type feature cache unit 352. Furthermore, a facial expression, pose, and mood of the object may be recognized based on the recognized object. However, inventive concepts are not limited, and the post-processing unit 370 may further include function blocks capable of tracking or recognizing features, such as the gender and age of the object.

Figure 8:
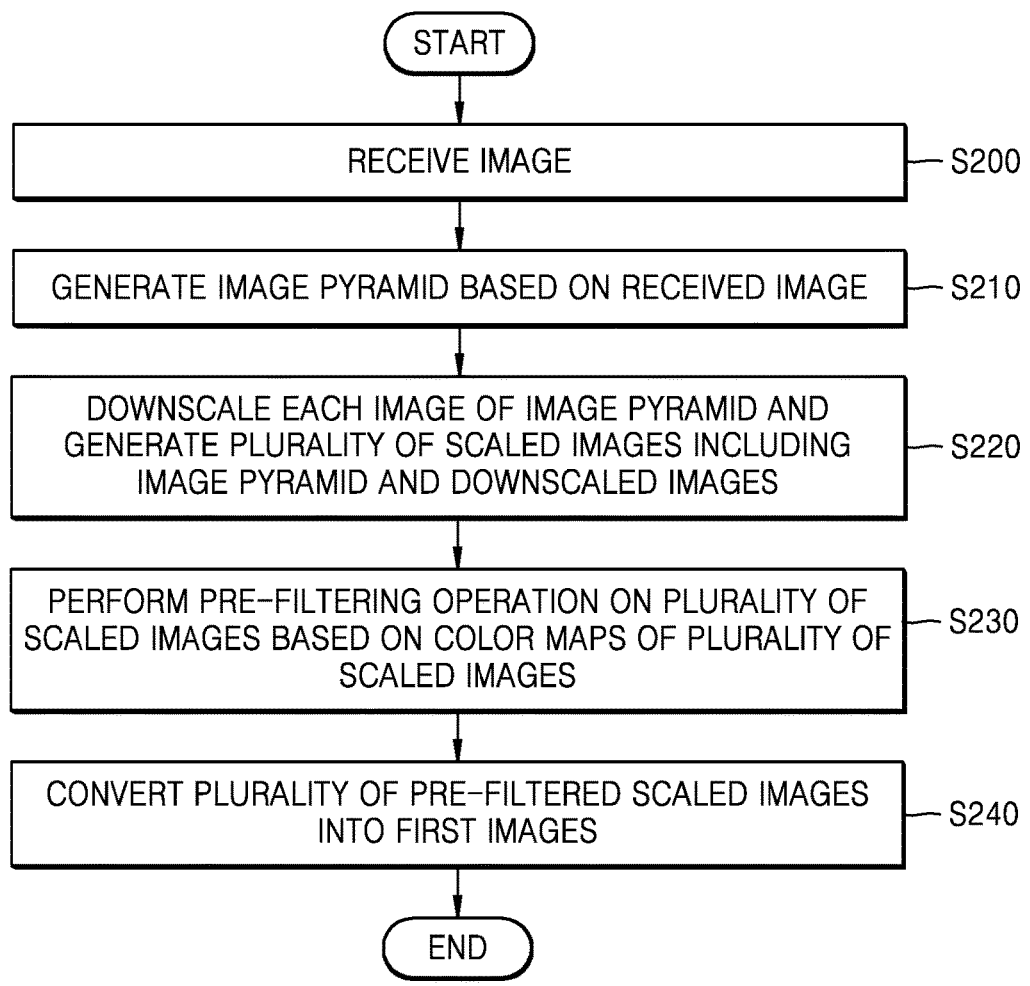
FIG. 8 is a flowchart of a method of converting an image received by an image processing device into a first image.

FIG. 8 is a flowchart of a method of converting an image received by an image processing device (e.g., the processing device 100) into a first image, according to an example embodiment.

Referring to FIG. 8, an image may be externally received (S200) by a pre-processing block (e.g., the pre-processing block 110). An image pyramid may be generated based on the received image (S210) by the pre-processing block. Each image of the image pyramid may be downscaled to generate a plurality of scaled images including the image pyramid and the downscaled images (S220) by a downscaling unit (e.g., the downscaling unit 123). A pre-filtering operation may be performed by a pre-filter unit (e.g., the pre-filter unit 125) on the plurality of scaled images based on color maps of the plurality of scaled images (S230). The pre-filtered scaled images may be converted into first images (S240) by a first image conversion unit (e.g., the first image conversion unit 127).

Figure 9:
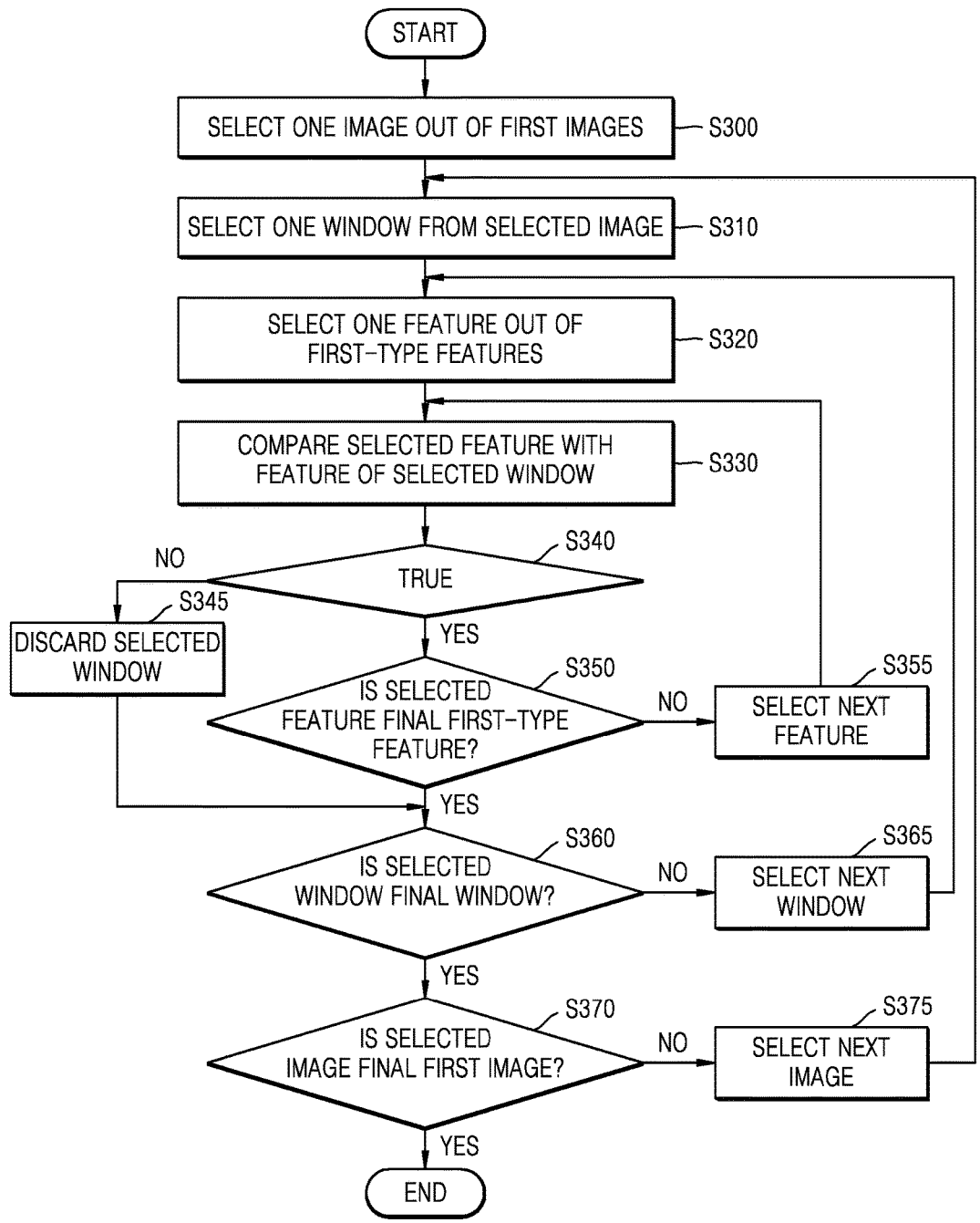
FIG. 9 is a flowchart of a first classification operation of a first classification unit according to an example embodiment.

FIG. 9 is a flowchart of a first classification operation of a first classification unit (e.g., the first classification unit 130) according to an example embodiment.

Referring to FIG. 9, one image may be selected out of first images (S300). A (first) window may be selected from the selected image (S310). One feature may be selected out of first-type features including a plurality of features (S320). The selected feature may be compared with a feature selected from the selected first window (S330). A comparison result may be determined as false when the comparison result is less than a reference value, and determined as true when the comparison result is equal to or more than the reference value. If the comparison result is determined as false, the selected window may be discarded (S345), and the next step S360 may be performed. Otherwise, if the comparison result is determined as true, it may be determined whether the selected feature is a final feature of the first-type features (S350). If the selected feature is not the final feature, a feature other than the selected feature may be selected (S355), and step S330 may be performed. Otherwise, if the selected feature is the final feature, it may be determined whether the selected window is a final window of the selected image (S360). If the selected window is not the final window, a window other than the selected window may be selected from the selected first image (S365), and step S320 may be performed. Otherwise, if the selected window is the final window, it may be determined whether the selected image is a final first image of the first images (S370). If the selected image is not the final first image, a first image other than the selected image may be selected out of the first images (S375), and step S310 may be performed. Otherwise, if the selected image is the final first image, the first classification operation may be ended.

Figure 10:
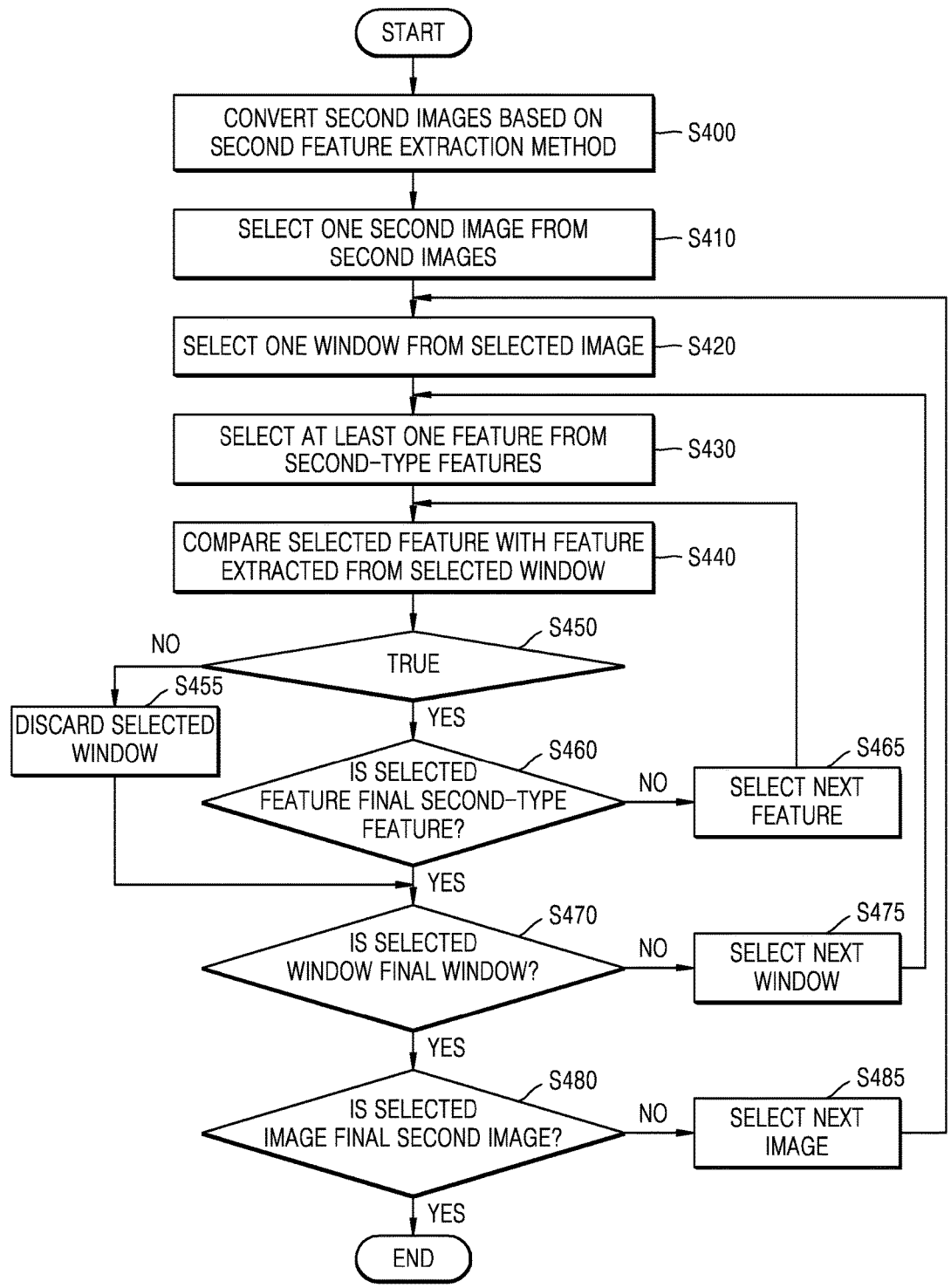
FIG. 10 is a flowchart of a second classification operation of a second classification unit according to an example embodiment.

FIG. 10 is a flowchart of a second classification operation of a second classification unit (e.g., the second classification unit 140) according to an example embodiment.

Referring to FIG. 10, the second images received from the first classification unit may be converted so as to apply a second feature extraction method to the second classification operation (S400). One second image may be selected out of the plurality of second images (S410). A (first) window may be selected from the selected image (S420).

At least one feature may be selected from second-type features including a plurality of features (S430). The selected feature may be compared with a feature extracted from the selected first window (S440). It may be determined whether the comparison result is true or false (S450). The comparison result may be determined as false if the comparison result is less than a reference value, and determined as true if the comparison result is equal to more than the reference value. If the comparison result is determined as false, the selected window may be discarded (S455), and step S470 may be performed. Otherwise, if the comparison result is determined as true, it may be determined whether the selected feature is a final feature of the second-type features (S460). If the selected feature is not the final feature, a feature other than the selected feature may be selected (S465), and step S440 may be performed. Otherwise, if the selected feature is the final feature, it may be determined whether the selected window is the final window of the selected image (S470). If the selected window is not the final window, a window other than the selected window may be selected from the selected second image (S475), and step S430 may be performed. Otherwise, if the selected window is the final window, it may be determined whether the selected image is a final second image of the second images (S480). If the selected image is not the final second image, a second image other than the selected image may be selected out of the second images (S485), and step S420 may be performed. Otherwise, if the selected image is the final second image, the second classification operation may be ended.

Figure 11:
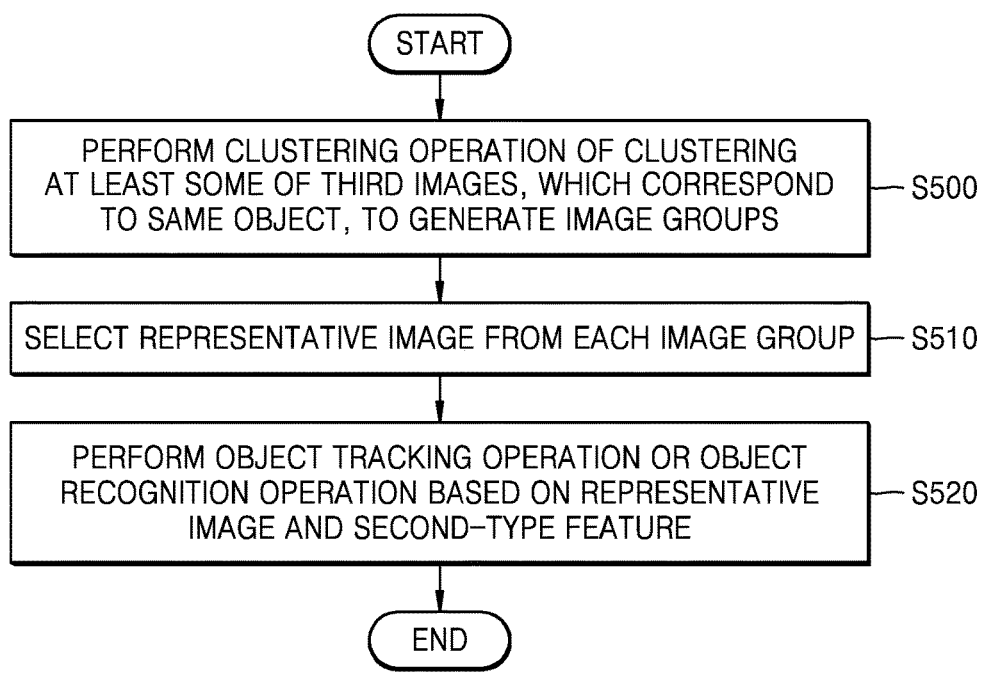
FIG. 11 is a flowchart of a method of detecting an object, according to an example embodiment.

FIG. 11 is a flowchart of a method of detecting an object, according to an example embodiment.

Referring to FIG. 11, at least some of a plurality of second images, which match second-type features, may be received as a plurality of third images, and a clustering operation may be performed by a clustering unit (e.g., the clustering unit 345) on at least some of the third images, which correspond to the same object, to generate image groups (S500). A representative image, which is an optimum and/or desired image, may be selected or set from among each of the image groups (S510) by the clustering unit. An object detection operation may be performed by a post-processing unit (e.g., the post-processing unit 370) based on the representative image. At least one of the representative image and the second-type features may be provided to an object tracking unit or an object recognition unit (S520). The object tracking unit or the object recognition unit may track or recognize an object based on the received representative image or second-type features.

Figure 12:
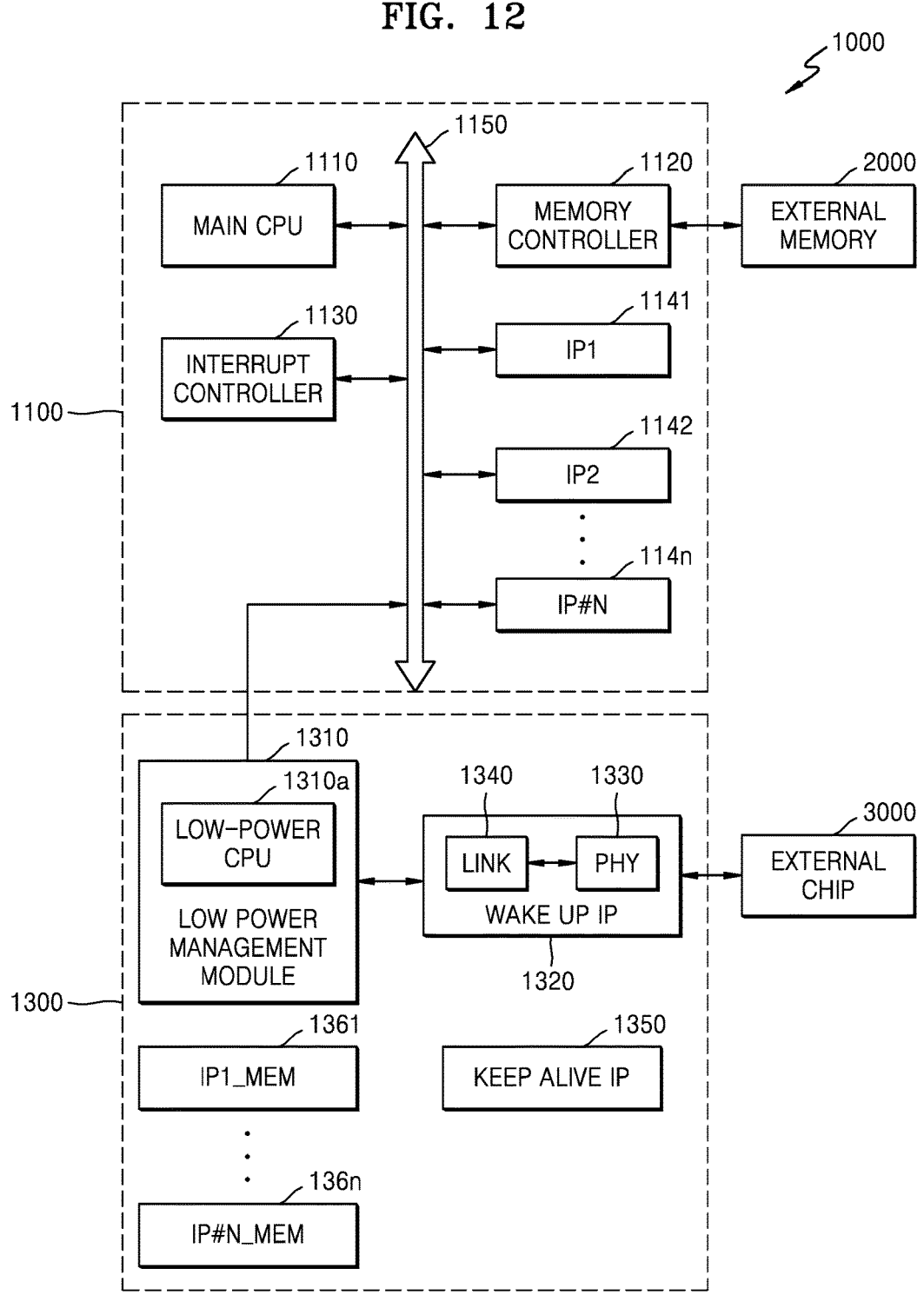
FIG. 12 is a block diagram of a System-on-Chip (SoC), and an external memory and an external chip, which communicate with the SoC, according to an example embodiment.

FIG. 12 is a block diagram of a SoC 1000, and an external memory 2000 and an external chip 3000, which communicate with the SoC 1000, according to an example embodiment. Referring to FIG. 12, the SoC 1000 may include a power-off domain block 1100 and a power-on domain block 1300.

The power-off domain block 1100 may be a block that is powered down to embody low power of the SoC 1000. The power-on domain block 1300 may be a block that is powered on to enable the power-off domain block 1100 to perform some operations while the power-off domain block 1100 is in a power-down state.

The power-off domain block 1100 may include a main CPU 1110, an interrupt controller 1130, a memory controller 1120, first to n-th intellectual properties (IPs) 1141 to 114n, and a system bus 1150

The main CPU 1110 may control the memory controller 1120 and access the external memory 2000. The memory controller 1120 may transmit data stored in the external memory 2000 to the system bus 1150 in response to the control of the main CPU 1110. When an interrupt (i.e., a specific event) occurs in each of the first to n-th IPs 1141 to 114n, the interrupt controller 1130 may inform the main CPU 1110 of the occurrence of the interrupt. The first to n-th IPs 1141 to 114*n* may perform specific operations according to a function of the SoC 1000. The first to n-th IPs 1141 to 114*n* may respectively access inherent internal memories 1361 to 136*n*. The power-on domain block 1300 may include internal memories 1361 to 136*n* of the respective first to n-th IPs 1141 to 114*n*.

The power-on domain block 1300 may include a low-power management module 1310, a wake-up IP 1320, a keep-alive IP 1350, and internal memories 1361 to 136*n* of the first to n-th IPs 1141 to 114*n*.

The low-power management module 1310 may determine whether to wake up the power-off domain block 1100 based on data transmitted from the wake-up IP 1320. The power-off domain block 1100 may be powered off in a standby state in which the SoC 1000 waits for an external input signal. A wake-up operation is an operation of applying power again when data is externally applied to the SoC 1000 that is powered off. That is, the wake-up operation may be an operation of putting the SoC 1000 from a standby state into an operation state (i.e., a power-on state) again.

The wake-up IP 1320 may include a PHY 1330 and a link 1340. The wake-up IP 1320 may serve as an interface between the low-power management module 1310 and the external chip 3000. The PHY 1330 may actually exchange data with the external chip 3000, and the link 1340 may transmit and receive the data, which is exchanged by the PHY 1330, to and from the low-power management module 1310 according to a predetermined and/or selected protocol.

The keep-alive IP 1350 may determine a wake-up operation of the wake-up IP 1320 and enable or disable power of the power-off domain block 1100.

The low-power management module 1310 may receive data from at least one of the first to n-th IPs 1141 to 114*n*. When the data is not processed but simply transmitted, the low-power management module 1310 may store the received data in an internal memory of the corresponding IP instead of the main CPU 1110.

The internal memories 1361 to 136*n* of the first to n-th IPs 1141~114*n* may be respectively accessed by the corresponding IPs in a power-on mode, and accessed by the low-power management module 1310 in a power-off mode. At least one of the first to n-th IPs 1141 to 114*n* may correspond to the preprocessing block 120 of the image processing device 100 of FIG. 2 and the post-processing block 360 of FIG. 7. For example, the at least one IP may include at least one of the preprocessing block 110 and the main processing block 120 of FIG. 2 and the post-processing block 360 of FIG. 7. The first to n-th IPs 1141 to 114*n* may include a graphics processing unit (GPU), a modem, a sound controller, and a security module.

At least one of the internal memories 1361 to 136*n* may correspond to the memory block 170 of the image processing device 100.

That is, the image processing device 100 may form the SoC 1000. The SoC 1000 may form an application processor (AP).

Figure 13:
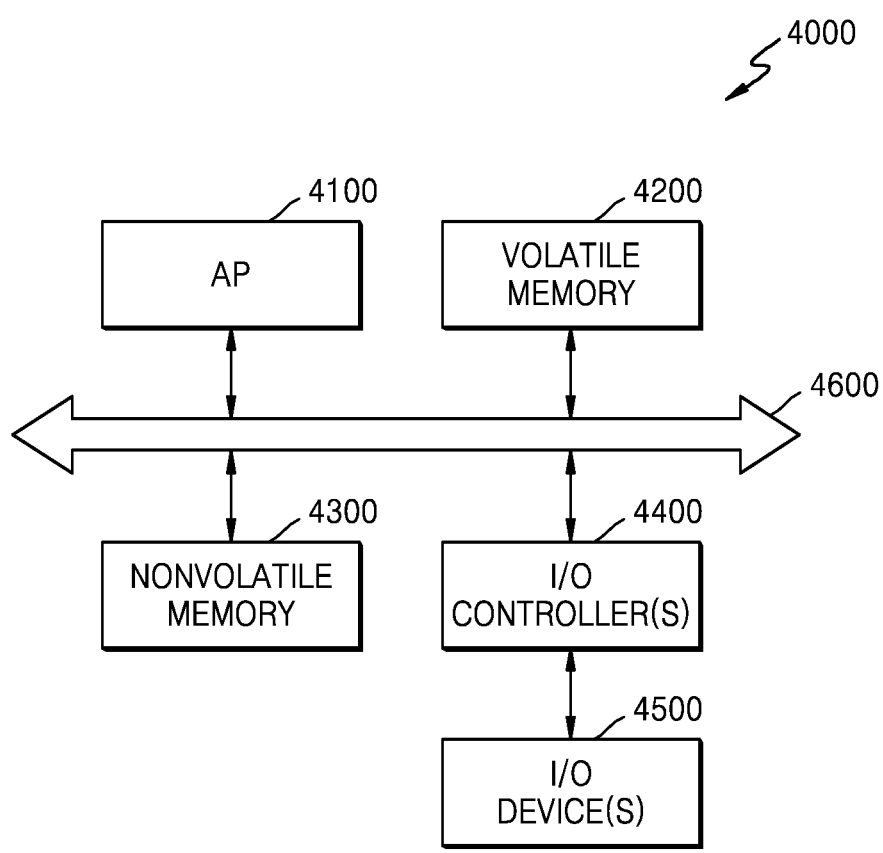
FIG. 13 is a block diagram of a multimedia device according to an example embodiment.

FIG. 13 is a block diagram of a multimedia device 4000 according to an example embodiment. Referring to FIG. 13, the multimedia device 4000 may include an AP 1100, a volatile memory 4200, a non-volatile memory 4300, at least one I/O controller 4400, at least one I/O device 4500, and a bus 4600.

The AP 4100 may be configured to control all operations of the multimedia device 4000. The AP 4100 may include one SoC. The AP 4100 may include the SoC 1000 described with reference to FIG. 12. The AP 4100 may include the image processing device 100 described with reference to FIG. 2. The AP 4100 may further include a GPU, a sound controller, or a security module. The AP 4100 may further include a modem.

The volatile memory 4200 may be an operation memory of the multimedia device 4000. The volatile memory 4200 may include dynamic random access memory (DRAM) or static RAM (SRAM).

The non-volatile memory 4300 may be a main storage of the multimedia device 4000. The non-volatile memory 4300 may include anon-volatile storage device, such as a flash memory, a hard disk drive (HDD), or a solid-state drive (SSD). The at least one I/O controller 4400 may be configured to control the at least one I/O device 4500. The at least one I/O device 4500 may include various devices configured to externally receive signals. The at least one I/O device 4500 may include a keyboard, a keypad, a button, a touch panel, a touch screen, a touch pad, a touch ball, a camera including an image sensor, a microphone, a gyroscopic sensor, an oscillation sensor, a wired input data port, or a wireless input antenna.

The at least one I/O device 4500 may include various devices configured to externally output signals. The at least one I/O device 4500 may include a liquid crystal display (LCD), an organic light-emitting diode (OLED) display device, an active-matrix OLED (AMOLED) display device, a light-emitting diode (LED) display device, a speaker, a motor, a wired output data port, or a wireless output antenna.

The multimedia device 4000 may obtain an image of an object, and perform an integration operation based on the obtained image. The multimedia device 4000 may track the object by using various features, and track a pose, mood, and atmosphere of the object.

The multimedia device 4000 may include a mobile multimedia device, such as a smartphone, a smart pad, a digital camera, a digital camcorder, or a laptop computer, or a fixed multimedia device, such as a smart television or a desktop computer.

While inventive concepts have been particularly shown and described with reference to example embodiments thereof, it will be understood that various changes in form and details may be made therein without departing from the spirit and scope of the following claims.

What is claimed is:
1. A method of detecting an object, the method comprising:
receiving an image;
generating first images for performing a first classification operation based on the received image;
reviewing first-image features of the first images using a first feature extraction method;
first classifying at least some of the first images as second images, the classified first images having first-image features matching first-type features calculated by using the first feature extraction method;
reviewing second-image features of the second images using a second feature extraction method;
second classifying at least some of the second images as third images, the classified second images having second-image features matching second-type features calculated by using the second feature extraction method; and
detecting an object in the received image based on results of the first and second classifying, wherein,
the first feature extraction method is different from the second feature extraction method, and the using the second feature extraction method is longer than the using the first feature extraction method.

2. The method of claim 1, wherein,
the first feature extraction method uses a Haar feature, and
the second feature extraction method uses any one of a local binary pattern (LBP), a histogram of oriented gradient (HOG), scale invariant feature transform (SIFT), a Gabor transform, Ferns, or modified census transform (MCT).

3. The method of claim 1, wherein a number of types of features in the first-type features is less than a number of types of features in the second-type features.

4. The method of claim 1, wherein,
the second images correspond to face candidate images of face candidates,
the second-type features correspond to human-body measurement information, and
the third images are a group of the face candidates including a face corresponding to the human-body measurement information.

5. The method of claim 1, wherein the generating the first images comprises:
generating an image pyramid based on the received image, the image pyramid having a plurality of pyramid images;
downscaling each pyramid image of the image pyramid;
generating a plurality of scaled images including the received image and the downscaled images;
filtering the plurality of scaled images based on color maps of the plurality of scaled images; and
converting the filtered scaled images into the first images.

6. The method of claim 1, wherein the first classifying classifies based on a first classifier, the second classifying classifies based on a second classifier, and the first classifier is a different type than the second classifier.

7. The method of claim 1, wherein the second classifying comprises:
converting the second images into a structure associated with the second feature extraction method.

8. The method of claim 1, further comprising:
clustering at least some of the third images; and
generating at least one image group based on the clustering, the clustered third images corresponding to a same object.

9. The method of claim 8, wherein the clustering includes selecting a representative image from among the at least one image group and the method further comprises:
performing an object tracking operation or an object recognition operation based on the representative image and the second-type features.

10. An image processing device comprising:
at least one processor configured to execute computer-readable instructions to,
receive an image and generate an image pyramid based on the received image, the image pyramid having a plurality of pyramid images;
receive the image pyramid, downscale each pyramid image of the image pyramid, and output some images of a plurality of scaled images including the received image and the downscaled images;
receive the some images and convert the some images into first images;
receive the first images, review first-image features of the first images using a first feature extraction method with first-type features, and firstly classify at least some of the first images as second images, the classified first images having first-image features matching the first-type features;
receive the second images, review second-image features of the second images using a second feature extraction method with second-type features, and secondly classify at least some of the second images as third images, the classified second images having second-image features matching the second-type features; and
convert the second images into a structure associated with the second feature extraction method.

11. The image processing device of claim 10,
wherein the at least one processor is configured to execute the computer-readable instructions to perform a clustering operation of at least some of the third images and generate at least one image group based on the clustering operation, the clustered third images corresponding to a same object.

12. The image processing device of claim 11, wherein the at least one processor is configured to execute the computer-readable instructions to select a representative image from among the image groups and
receive the representative image and at least one of the second-type features and track or recognize the same object based on the received representative image and at least one second-type feature.

13. The image processing, device of claim 10, wherein a method of extracting the first-type features is different from a method of extracting the second-type features.

14. A method comprising:
receiving a number of first images based on an obtained image;
first classifying a portion of the first images as second images based on first-type features;
second classifying a portion of the second images as third images based on second-type features, a number of types of features in the first-type features being less than a number of types of features in the second-type features; and
detecting an object in the obtained image based on the third images, wherein the first classifying uses a first extraction method and the second classifying uses a second extraction method.

15. The method of claim 14, wherein the first-type features include a size of the object and a shape of the object.

16. The method of claim 15, wherein the second-type features include a pattern of the objection and a color of the object.

17. The method of claim 14, wherein the first extraction method is shorter than the second extraction method.

* * * * *